United States Patent
Dearn

(10) Patent No.: US 8,085,005 B2
(45) Date of Patent: Dec. 27, 2011

(54) BUCK-BOOST CONVERTER WITH SAMPLE AND HOLD CIRCUIT IN CURRENT LOOP

(75) Inventor: David Dearn, Malmesbury (GB)

(73) Assignee: Micrel, Inc., San Jose, CA (US)

( * ) Notice: Subject to any disclaimer, the term of this patent is extended or adjusted under 35 U.S.C. 154(b) by 397 days.

(21) Appl. No.: 12/487,621

(22) Filed: Jun. 18, 2009

(65) Prior Publication Data

US 2010/0320992 A1 Dec. 23, 2010

(51) Int. Cl.
*G05F 1/00* (2006.01)

(52) U.S. Cl. ......................................... 323/222; 323/282

(58) Field of Classification Search .................. 323/222, 323/224, 282
See application file for complete search history.

(56) References Cited

U.S. PATENT DOCUMENTS

| | | | |
|---|---|---|---|
| 7,570,033 B1 * | 8/2009 | Ju | 323/284 |
| 7,772,904 B1 * | 8/2010 | Cooke | 327/175 |
| 7,808,217 B2 * | 10/2010 | de Cremoux et al. | 323/222 |
| 7,843,177 B2 * | 11/2010 | Ho et al. | 323/222 |
| 2006/0273768 A1 * | 12/2006 | Chen et al. | 323/224 |
| 2007/0052395 A1 * | 3/2007 | Belch | 323/222 |
| 2007/0252567 A1 * | 11/2007 | Dearn et al. | 323/282 |
| 2010/0148587 A1 * | 6/2010 | Khaligh | 307/72 |
| 2010/0314945 A1 * | 12/2010 | Yamazaki et al. | 307/80 |
| 2011/0074356 A1 * | 3/2011 | Yamazaki et al. | 320/134 |

* cited by examiner

*Primary Examiner* — Jue Zhang

(74) *Attorney, Agent, or Firm* — Patent Law Group LLP

(57) ABSTRACT

In an average-current mode control type buck-boost PWM converter, a sample and hold circuit is inserted in the current loop to avoid problems associated with ripple of the average inductor current demand signal. The rippling average inductor current is generated by a differential transconductance amplifier having applied to its inputs an error signal and a signal corresponding to the instantaneous current through the inductor, where the output of the amplifier is filtered. The rippling average inductor current is sampled and held at the beginning of each switching cycle, prior to the average inductor current demand signal being compared to buck and boost sawtooth waveforms. By using the sample and hold circuit, the feedback loops are easier to stabilize, and the converter cannot switch modes during a switching cycle.

14 Claims, 2 Drawing Sheets

US 8,085,005 B2

BUCK-BOOST CONVERTER WITH SAMPLE AND HOLD CIRCUIT IN CURRENT LOOP

FIELD OF THE INVENTION

This invention relates to DC-DC voltage converters and, in particular, to a buck-boost converter using average current mode control.

BACKGROUND

A buck-boost voltage converter receives an unregulated input voltage and generates an increased or decreased regulated output voltage, where the target output voltage is set by component values in a feedback circuit. The buck-boost converters related to the present inventor are pulse-width modulation (PWM) converters, where the switching duty cycle of either buck or boost mode transistor switches controls the output voltage. The switching causes current through a smoothing inductor to ramp up and down as the inductor is charging and discharging.

A voltage mode converter regulates the output voltage by applying a fraction of the output voltage to a first input of an error amplifier, where the second input of the error amplifier is coupled to a fixed reference voltage. The output of the error amplifier (the error voltage) is then compared to a sawtooth waveform to turn the converter switches on and off at a duty cycle required to keep the two inputs into the error amplifier matched. Although the sawtooth frequency is typically greater than 1 MHz, the voltage feedback loop is a relatively slow loop since the output voltage is highly filtered and is slow to change.

A peak current mode control converter compares the error voltage to a varying signal directly corresponding to the instantaneous current through the inductor. The switching transistors are reset when the ramping inductor current crosses the error voltage. This is called peak inductor current control. The current feedback loop is a fast loop since the charging of the inductor is immediately stopped upon the ramp reaching a threshold. This control method provides a very fast response to transient conditions, such as short circuits and overload conditions.

A much less common control method is called average current control. In such a control method, the varying signal (directly corresponding to the instantaneous inductor current) and the error voltage are applied to inputs of a differential transconductance amplifier, and the output of the differential transconductance amplifier is filtered to substantially average the output of the amplifier (related to the average of the inductor current). The filtered signal is referred to herein as the "average inductor current demand signal," which is not actually the average inductor current but only related to it. Such a filter may be a type II compensation network or other suitable filter. The filtered waveform is then compared to a sawtooth signal to control the switching of the converter's transistors. Such a control mode provides increased current loop gain at low frequencies and improves immunity to noise in the inductor current. Such characteristics are beneficial in certain applications.

In a buck-boost converter using average current control, the average inductor current demand signal is compared to a buck sawtooth waveform (having a peak corresponding to 100% duty cycle of buck switching transistors) and compared to a higher voltage boost sawtooth waveform (having a base voltage starting at the buck sawtooth waveform peak and a peak corresponding to 100% duty cycle of the boost switching transistors). The level of the average inductor current demand signal automatically controls whether the converter operates in the buck or boost mode and controls the duty cycle of the switching transistors.

There is some residual ripple of the average inductor current demand signal after it has been filtered by the compensation circuit. This ripple has three main effects. The current loop gain depends not just upon the sawtooth generator slopes but also on the average inductor current ripple slope. Subharmonic oscillation can result if the off-time ripple slope is too large. And, the buck-boost converter can jump between the two modes in the middle of a switching cycle if this residual ripple is too high. The compensation circuit cannot have too slow of a time constant or else the regulator will not adequately react to transient conditions, so traditionally some ripple must be tolerated.

What is needed is a buck-boost converter that uses average current control and does not suffer from the drawbacks mentioned above.

SUMMARY

A buck-boost PWM converter is described that uses average current control. To avoid the problems associated with ripple of the average inductor current demand signal, a sample and hold circuit is inserted within the current feedback loop, typically after the compensation circuit and prior to the average inductor current demand signal being compared to the buck and boost sawtooth waveforms. The sample and hold circuit is reset by a clock that locks in a sample of the average inductor current demand signal at a particular time during each switching cycle, such as immediately prior to the beginning of a switching cycle, and then again samples the average inductor current demand signal immediately prior to the beginning of the next switching cycle.

By using the invention, there is minimal loss of transient response, the gain of the loop is independent of the slope of the ripple, the loop is easier to stabilize over a wide bandwidth and input and output voltages, sub-harmonic oscillation cannot be caused by the inductor off-time slope being too great, and the converter cannot switch modes during a switching cycle.

BRIEF DESCRIPTION OF THE DRAWINGS

Elements in the various figures labeled with the same numerals may be identical.

DETAILED DESCRIPTION

Figure 1:
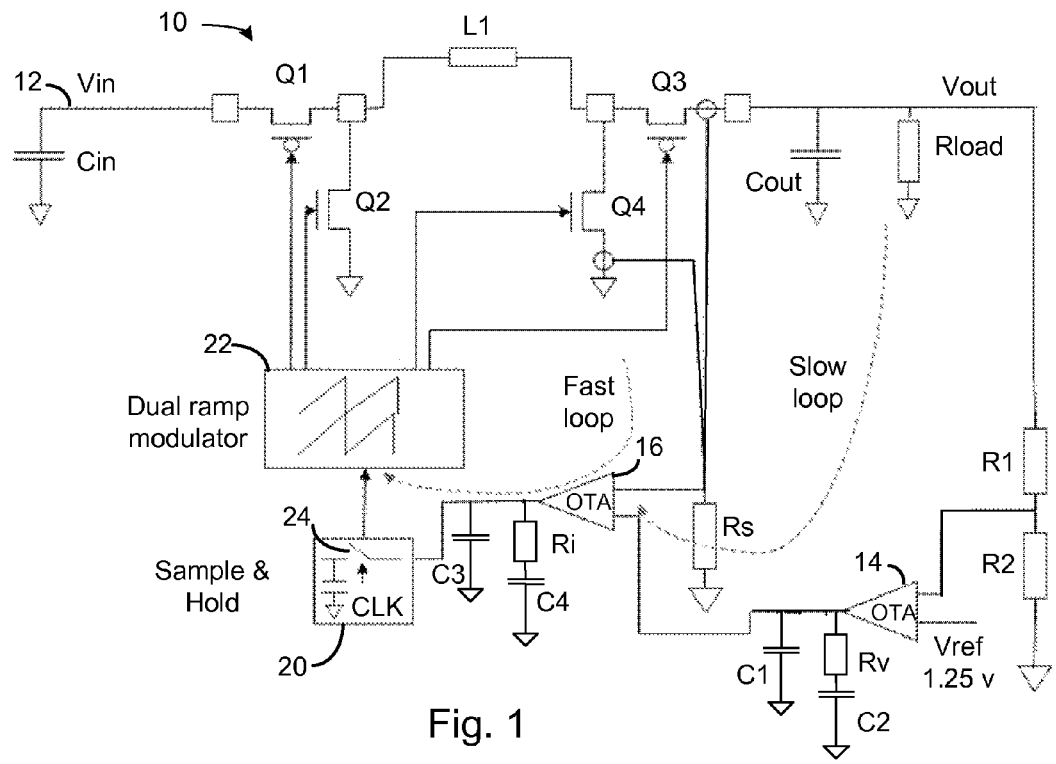
FIG. 1 is a simplified schematic diagram of a PWM buck-boost converter in accordance with one embodiment of the invention.

FIG. 1 illustrates a PWM buck-boost converter 10 incorporating the present invention. An unregulated input voltage Vin is applied to an input 12 and filtered by an input capacitor Cin.

In the buck mode, to charge the inductor L1, a PMOS transistor Q1 is switched on, an NMOS transistor Q2 is switched off, a PMOS transistor Q3 remains on, and an NMOS transistor Q4 remains off. The current through the inductor L1 then ramps up.

A large output capacitor Cout filters the ramping inductor current to create a fairly stable regulated output voltage Vout across any load, represented by the resistive load Rload. The target output voltage Vout is set by the values of the resistors R1 and R2 in a voltage divider so that, when the output voltage Vout is at the target voltage, the divided voltage equals the reference voltage Vref of approximately 1.25 v.

Vref and the divided voltage are applied to inputs of an operational transconductance amplifier (OTA) 14, as part of the slow voltage loop. The output of the OTA 14 is connected to an integrating filter, although any compensation network may also be used, such as the classic type II compensation circuit (shown in FIG. 3). In FIG. 1, the filter comprises a capacitor C1 connected to ground in parallel with an RC filter consisting of a resistor Rv and a capacitor C2 in series. The output of the filter will be an error voltage whose level determines the current demanded by the converter to maintain the regulated output voltage. The output of OTA 16, compensated by the compensation network Ri, C4 and C3 (described in detail later), controls the duty cycle of the buck or boost switching transistors. For a target output voltage below the input voltage Vin (assuming no losses), the error voltage level controls the duty cycle of the buck mode transistors. For a target output voltage above the input voltage Vin, the error voltage level exceeds that level corresponding to 100% duty cycle of the buck mode, and the error voltage level causes the boost mode transistors to switch at the corresponding duty cycle to achieve the target output voltage.

The combination of the OTA 14 and filter is referred to as an error amplifier, where the filter can be any type of suitable filter.

The error voltage is applied to one input of an OTA 16 in the current feedback loop. In the buck mode, transistor Q3 is always on. Transistor Q3 may include a small sense transistor cell that conducts a small fraction of the inductor current, although one skilled in the art may consider other methods of current sensing, such as sensing the voltage across an inline resistor or integrating the inductor voltage or using a sense device in one of the other transistors. That small fraction is applied to ground through a current sense resistor Rs. In the buck mode, while the inductor L1 is charging due to transistor Q1 being on, the ramping voltage across the resistor Rs is applied to the other input of the OTA 16. OTAs 14 and 16 are differential transconductance amplifiers, although any suitable filtering network (such as the classic type II compensation network of FIG. 3) could be used A low pass filter, which may have a configuration similar to that for the voltage loop, is connected to the output of the OTA 16. The filter comprises a capacitor C3, resistor Ri, and capacitor C4. The component values will be different than those of the voltage loop filter due to the different signals applied to the respective OTAs. One skilled in the art is aware of selecting component values for filters for achieving desired rolloffs, gain vs. frequency, zeros, and poles. Guidelines for designing such filters are the subject of many papers and articles.

The OTA 16 detects the difference between the fairly stable error voltage (from the error amplifier) and the high frequency ramping inductor current, and will effectively generate a signal that tracks the ramping inductor current. The filter at the output of the OTA 16 smoothes the output to create an average inductor current demand signal. The value of the current sense resistor Rs is selected to cause the ramping voltage to be within a suitable range for proper operation.

The average inductor current demand signal created at the output of the filter will have ripple at the switching frequency. The characteristics of the ripple, as previously described, affect the performance of the converter 10 and can lead to instability.

Figure 2:
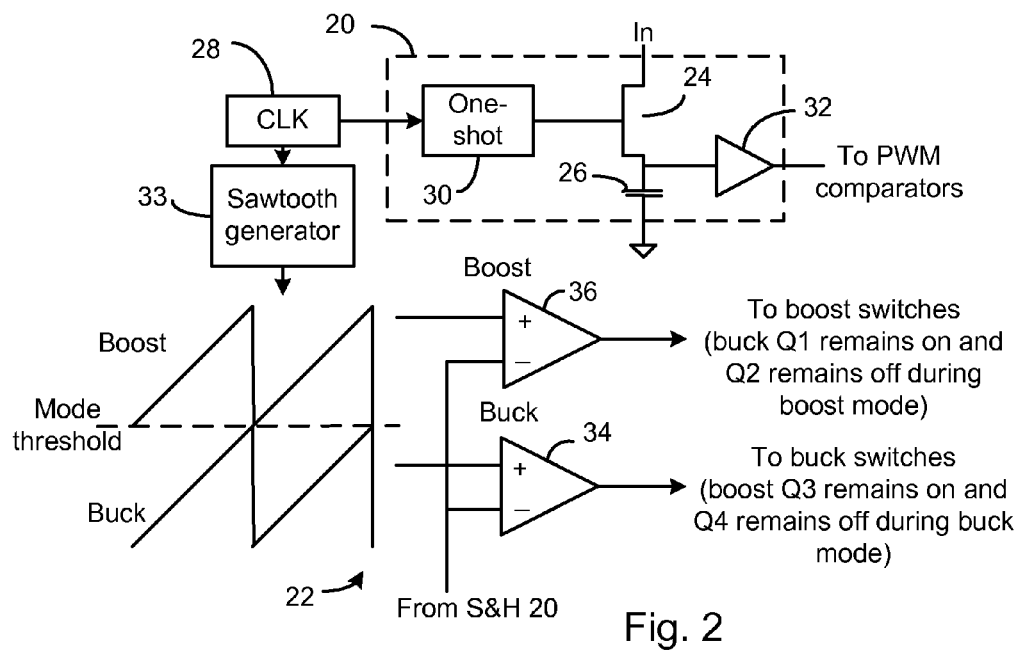
FIG. 2 illustrates the buck and boost sawtooth waveforms being compared with the sample and held average inductor current demand signal for setting the mode and duty cycle of the converter switching transistors.

To avoid such adverse effects of the ripple, a sample and hold (S&H) circuit 20 is inserted between the average inductor current demand signal and the dual ramp modulator 22. The S&H circuit 20 in FIG. 1 comprises a transistor switch 24 (e.g., an NMOS transistor) turned on and off at the frequency of the dual ramp modulator 22 by a clock 28 (FIG. 2). The transistor switch 24, at the beginning of the cycle, connects the rippling average inductor current input signal to a capacitor 26 (FIG. 2) so that the capacitor 26 is set (sampled) at the input signal level. The switch 24 is then opened to hold the sampled level until the switch 24 is again closed. FIG. 2 illustrates more detail of one type of S&H circuit 20, where the clock 28 causes a one-shot circuit 30 to close the switch 24 for a short, preset time at the beginning of the cycle. A buffer 32 may be used between the capacitor 26 and the output of the S&H circuit 20. This is only one embodiment of a sample and hold circuit, and other embodiments are envisioned.

Referring back to FIG. 1, the stable held voltage is used to select the buck or boost mode of operation and set the duty cycle. The dual ramp modulator 22 generates two offset sawtooth waveforms, shown in FIG. 2 being generated by a sawtooth generator 33. The sawtooth generator 33 may generate the waveforms by applying a fixed current source to a capacitor and resetting the capacitor at the beginning of each switching cycle. The boost and buck sawtooth waveforms are then level shifted to the required levels using a DC offset.

If the held average inductor current demand signal is below the mode threshold level (FIG. 2), the signal will cross the buck sawtooth waveform at a certain time. At the beginning of a switching cycle, the buck mode charging transistor Q1 is turned on and, when the sawtooth waveform crosses the held signal, transistor Q1 is turned off and transistor Q2 is turned on to discharge the inductor L1. FIG. 2 illustrates the PWM buck comparator 34 that compares the buck sawtooth waveform to the held voltage. In this manner, the held signal controls the duty cycle so that the divided feedback voltage and reference voltage at the inputs of the OTA 14 substantially match, and voltage regulation is achieved. During the buck mode, the boost mode transistor Q3 remains on and transistor Q4 remains off.

If the held voltage is above the mode threshold, then the boost sawtooth waveform will cross the held voltage. At the beginning of the boost switching cycle, transistor Q4 is on to charge the inductor L1. Transistor Q4 includes a small sense transistor cell that conducts a small fraction of the inductor current. During the charge portion of the switching cycle, that small fraction is applied to ground through the current sense resistor Rs. As mentioned previously, other embodiments for current sensing during boost mode are possible. The crossing of the boost sawtooth waveform turns off transistor Q4 and turns on transistor Q3 to discharge the inductor L1 into the output capacitor Cout and load. A fraction of the current conducted by transistor Q3 is conducted through the current sense resistor Rs. As previously described, the ramping inductor current waveform and the error signal are applied to OTA 16, then the OTA 16 output is filtered and sampled and held by the S&H circuit 20. FIG. 2 illustrates the PWM boost comparator 36 that compares the boost sawtooth waveform to the held voltage. In this manner, the held signal controls the duty cycle of the boost transistors so that the divided feedback voltage and reference voltage at the inputs of the OTA 14 substantially match, and voltage regulation is achieved. During the boost mode, the buck mode transistor Q1 remains on and transistor Q2 remains off.

By using the S&H circuit 20 to stabilize the average inductor current demand signal, there is minimal loss of transient response since the converter 10 still reacts within a clock cycle, the gain of the current loop is independent of the slope of the average inductor current ripple, the current loop and voltage loop are easier to stabilize over a wide bandwidth and input and output voltages, sub-harmonic oscillation cannot be caused by the inductor off-time slope being too great, and the converter 10 cannot switch modes during a switching cycle since the held signal will remain above or below the mode threshold for the entire cycle. Any suitable S&H circuit 20 can be used.

By placing the S&H circuit 20 after the filter, any ripple of the voltage error signal applied to the OTA 16 will not create ripple at the input of the dual ramp modulator.

Although the S&H circuit 20 slightly reduces the bandwidth of the current loop, such reduction occurs at higher frequencies so the practical effect is minimal. The switching frequency will typically be between 1 MHz-10 MHz.

Figure 3:
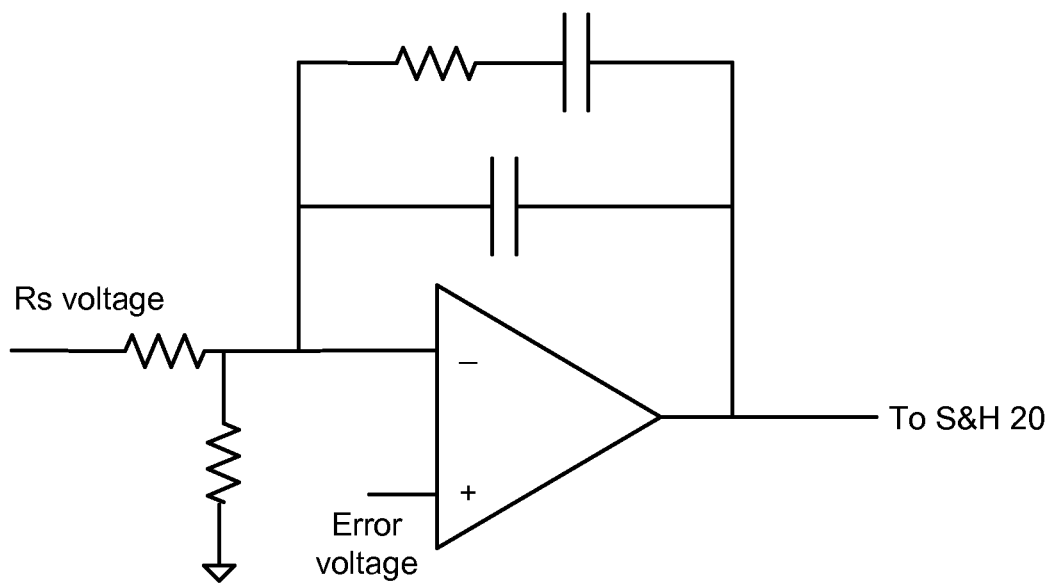
FIG. 3 illustrates an example of a conventional type II compensation circuit that may be used to establish an average inductor current demand signal.

FIG. 3 illustrates a classic type II filter that may be used instead of the integrating filters utilizing OTAs 14 and 16 shown in FIGS. 1 and 2. Conventional type I and type III filters may also be used.

Other types of filters may also be used.

Transistors Q2 and Q3, acting as synchronous rectifiers, may be replaced by diodes.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A DC to DC, buck-boost voltage converter comprising:
a buck switching circuit comprising at least one buck switching transistor coupled between an input voltage and a first end of an inductor, the buck switching circuit being coupled to charge and discharge the inductor during a buck mode of the converter;
a boost switching circuit comprising at least one boost switching transistor connected between a second end of the inductor and ground, the boost switching circuit being coupled to charge and discharge the inductor during a boost mode of the converter;
an output capacitor coupled to smooth a current through the inductor;
an output voltage terminal coupled to the output capacitor for providing a regulated voltage to a load;
an error amplifier connected to receive a voltage proportional to the regulated voltage and output an error signal;
a differential transconductance amplifier having a first input connected to the error signal and a second input connected to receive a signal corresponding to an instantaneous inductor current;
a low pass filter filtering an output of the differential transconductance amplifier, an output of the low pass filter providing a rippling voltage having an average level set by the error signal;
a sample and hold circuit connected to an output of the low pass filter, the sample and hold circuit comprising a clock and a storage device that samples an output of the low pass filter at particular time during each switching cycle and outputs a held sampled voltage until a next sampling time; and a modulator that compares the held sampled voltage to a buck sawtooth waveform and to a boost sawtooth waveform, wherein crossing times of the held sampled voltage by the buck sawtooth waveform or boost sawtooth waveform control a switching duty cycle of the at least one buck switching transistor or the at least one boost switching transistor, depending on a magnitude of the held sampled voltage, to generate the regulated voltage.

2. The converter of claim 1 wherein the clock also controls a sawtooth generator that generates the buck sawtooth waveform and the boost sawtooth waveform such that the voltage is held for at least a portion of ramping up of the buck sawtooth waveform and the boost sawtooth waveform.

3. The converter of claim 1 wherein the low pass filter is an integrating filter.

4. The converter of claim 1 wherein the low pass filter is a type II filter.

5. The converter of claim 1 wherein the low pass filter is a type I filter.

6. The converter of claim 1 wherein the low pass filter is a type III filter.

7. The converter of claim 1 wherein the at least one buck switching transistor comprises a charging buck transistor and a discharging buck transistor, and the at least one boost switching transistor comprises a charging boost transistor and a discharging boost transistor.

8. The converter of claim 1 wherein the storage device is a capacitor.

9. A DC to DC, buck-boost voltage converter comprising:
a buck switching circuit coupled to charge and discharge an inductor in a buck mode of operation;
a boost switching circuit coupled to charge and discharge the inductor in a boost mode of operation;
an output capacitor coupled to smooth a current through the inductor;
an output voltage terminal coupled to the output capacitor for providing a regulated voltage to a load;
an error amplifier connected to receive a voltage proportional to the regulated voltage and output an error signal;
an averaging circuit connected to receive the error signal and a signal corresponding to an instantaneous inductor current, the averaging circuit configured for generating a filtered rippling voltage related to inductor current and having an average level set by the error signal;
a sample and hold circuit connected to sample and hold the filtered rippling voltage at a particular time during each switching cycle of the buck switching circuit or the boost switching circuit, the sample and hold circuit controlled to output a substantially constant held sampled voltage until a next sampling time; and
a modulator that compares the held sampled voltage to a buck sawtooth waveform and to a boost sawtooth waveform, wherein crossing times of the held sampled voltage by the buck sawtooth waveform or boost sawtooth waveform control a switching duty cycle of the buck switching circuit or the boost switching circuit, depending on a magnitude of the held sampled voltage, to generate the regulated voltage.

10. The converter of claim 9 wherein the averaging circuit comprises a differential transconductance amplifier connected to receive the error signal and the signal corresponding to the instantaneous inductor current, and a low pass filter connected to an output of the differential transconductance amplifier.

11. A method performed by a DC to DC, buck-boost voltage converter comprising:
detecting a regulated output voltage of the converter;

generating an error signal by comparing a fraction of the output voltage to a reference voltage;

generating a signal corresponding to an instantaneous current through an inductor;

applying the error signal and the signal corresponding to the instantaneous current through the inductor to inputs of a differential transconductance amplifier;

filtering an output of the differential transconductance amplifier to generate a filtered rippling voltage having an average level set by the error signal;

sampling the rippling voltage at a particular time during each switching cycle of the converter and holding the sampled voltage, as a substantially constant held voltage, throughout a remainder of the switching cycle; and comparing the held voltage to a buck sawtooth waveform and to a boost sawtooth waveform, wherein crossing times of the held sampled voltage by the buck sawtooth waveform or boost sawtooth waveform control a switching duty cycle of at least one buck switching transistor or at least one boost switching transistor, depending on a magnitude of the held voltage, to generate the regulated output voltage.

12. The method of claim 11 wherein sampling the rippling voltage at a particular time during each switching cycle of the converter and holding the sampled voltage comprises temporarily coupling the filtered rippling voltage to a storage device by a clock controlling a switch, the method further comprising generating the buck sawtooth waveform and the boost sawtooth waveform by using the clock so that the sampling is synchronized with the buck sawtooth waveform and the boost sawtooth waveform.

13. The method of claim 11 wherein filtering an output of the differential transconductance amplifier comprises low pass filtering the output using one of a type I, II, or III network.

14. The method of claim 11 wherein the at least one buck switching transistor comprises a charging buck transistor and a discharging buck transistor, and the at least one boost switching transistor comprises a charging boost transistor and a discharging boost transistor.

* * * * *